United States Patent [19]

Peterman

[11] Patent Number: 4,520,317
[45] Date of Patent: May 28, 1985

[54] APPARATUS INCLUDING A PAIR OF AUTOMATIC GAIN CONTROLLED AMPLIFIERS FOR DETERMINING THE LATERAL DIRECTION TO A CONCEALED CONDUCTIVE OBJECT

[75] Inventor: Earl J. Peterman, Philo, Calif.

[73] Assignee: Metrotech, Inc., Mountain View, Calif.

[21] Appl. No.: 500,634

[22] Filed: Jun. 3, 1983

Related U.S. Application Data

[62] Division of Ser. No. 174,185, Jul. 31, 1980, Pat. No. 4,387,340.

[51] Int. Cl.³ .................. G01V 3/11; G01V 3/165
[52] U.S. Cl. .................................... 324/326
[58] Field of Search ............. 324/67, 207, 326, 233

[56] References Cited

U.S. PATENT DOCUMENTS

| 3,617,865 | 11/1971 | Hakata | 324/67 X |
| 3,991,363 | 11/1976 | Lathrop | 324/67 X |
| 4,091,322 | 5/1978 | Stankoff | 324/67 X |
| 4,134,061 | 1/1979 | Gudgel | 324/326 X |
| 4,220,913 | 9/1980 | Howell et al. | 324/326 X |

FOREIGN PATENT DOCUMENTS

| 2329008 | 10/1975 | France | 324/326 |
| 66170 | 5/1979 | Japan | 324/326 |
| 2006438 | 5/1979 | United Kingdom | 324/67 |

Primary Examiner—Gerald R. Strecker
Attorney, Agent, or Firm—Limbach, Limbach & Sutton

[57] ABSTRACT

An apparatus to measure the distance to a concealed conductive object, radiating an electromagnetic signal, has two sensors, each adapted to receive the signal and to produce an output voltage proportional to the amount of signal received. Amplifier means amplify the output voltage. Automatic gain control means automatically controls the gain to the amplifier means such that the gain of the amplification of one of the output voltages is the same as the gain of the amplification of the other output voltage. Computing means calculate the distance based upon the two amplified output voltages. Display means display the calculated value.

7 Claims, 11 Drawing Figures

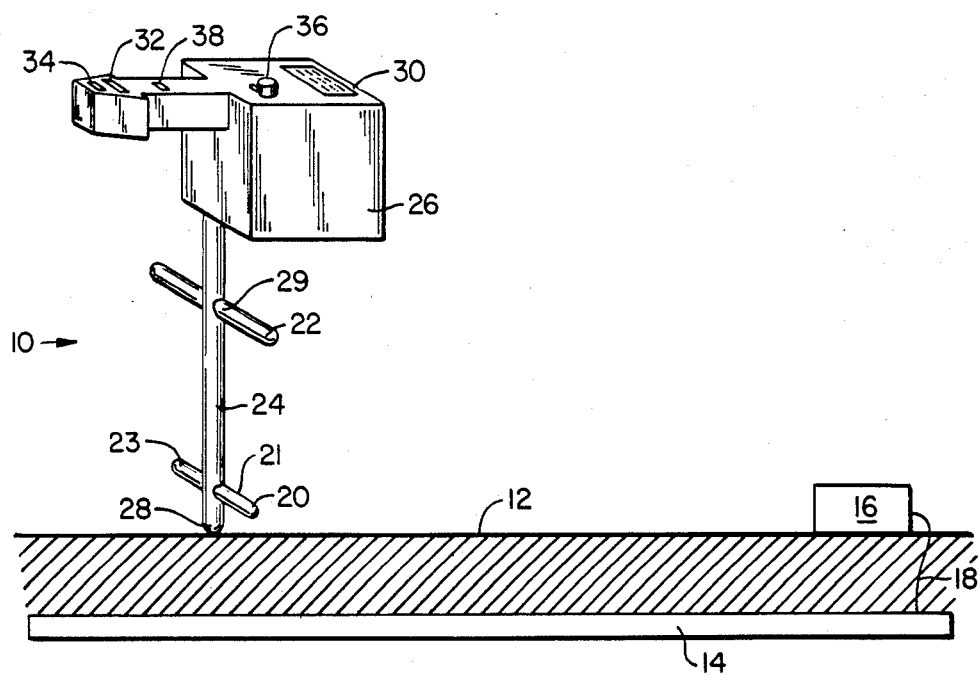
FIG._1.

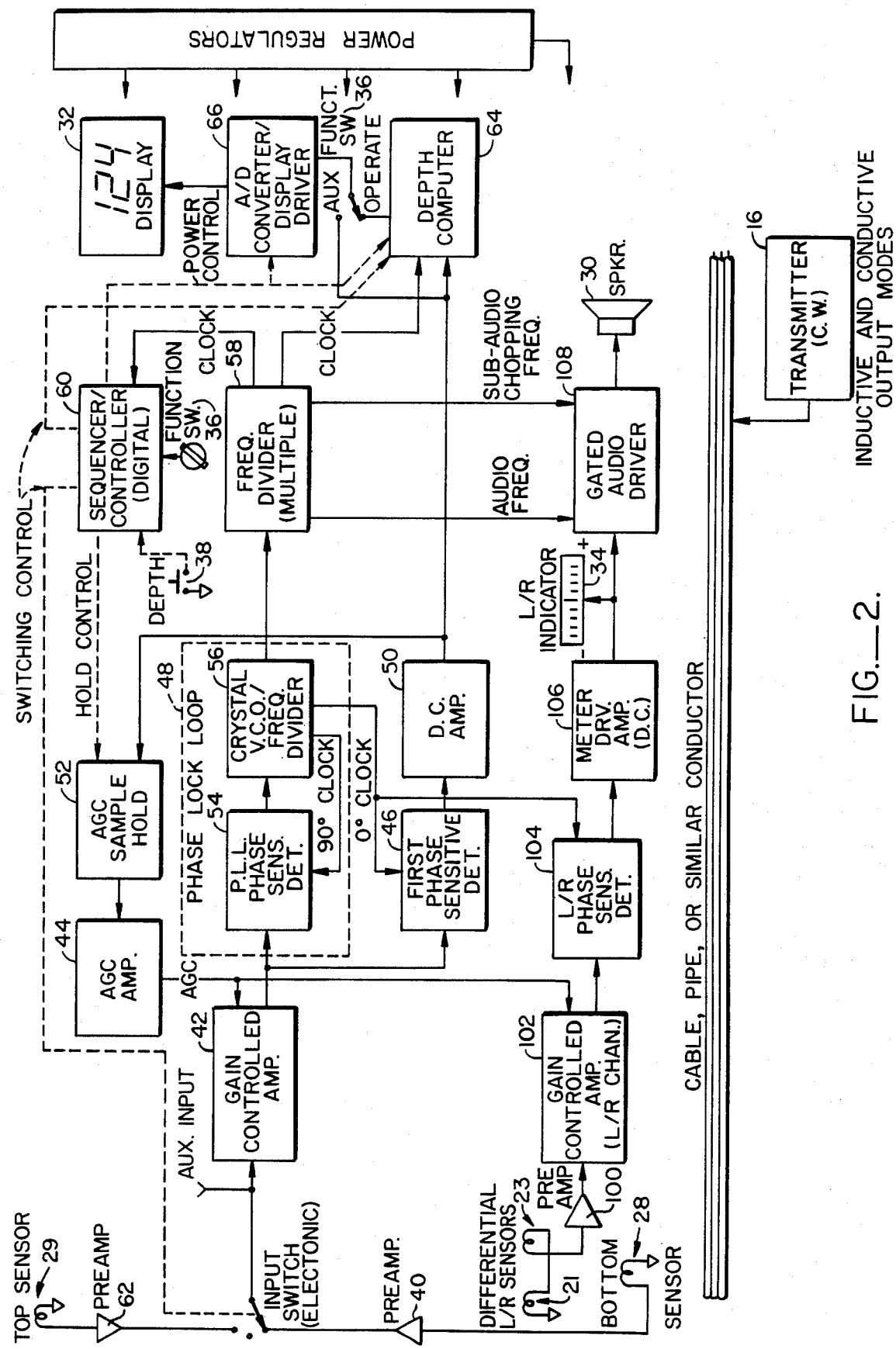
FIG._2.

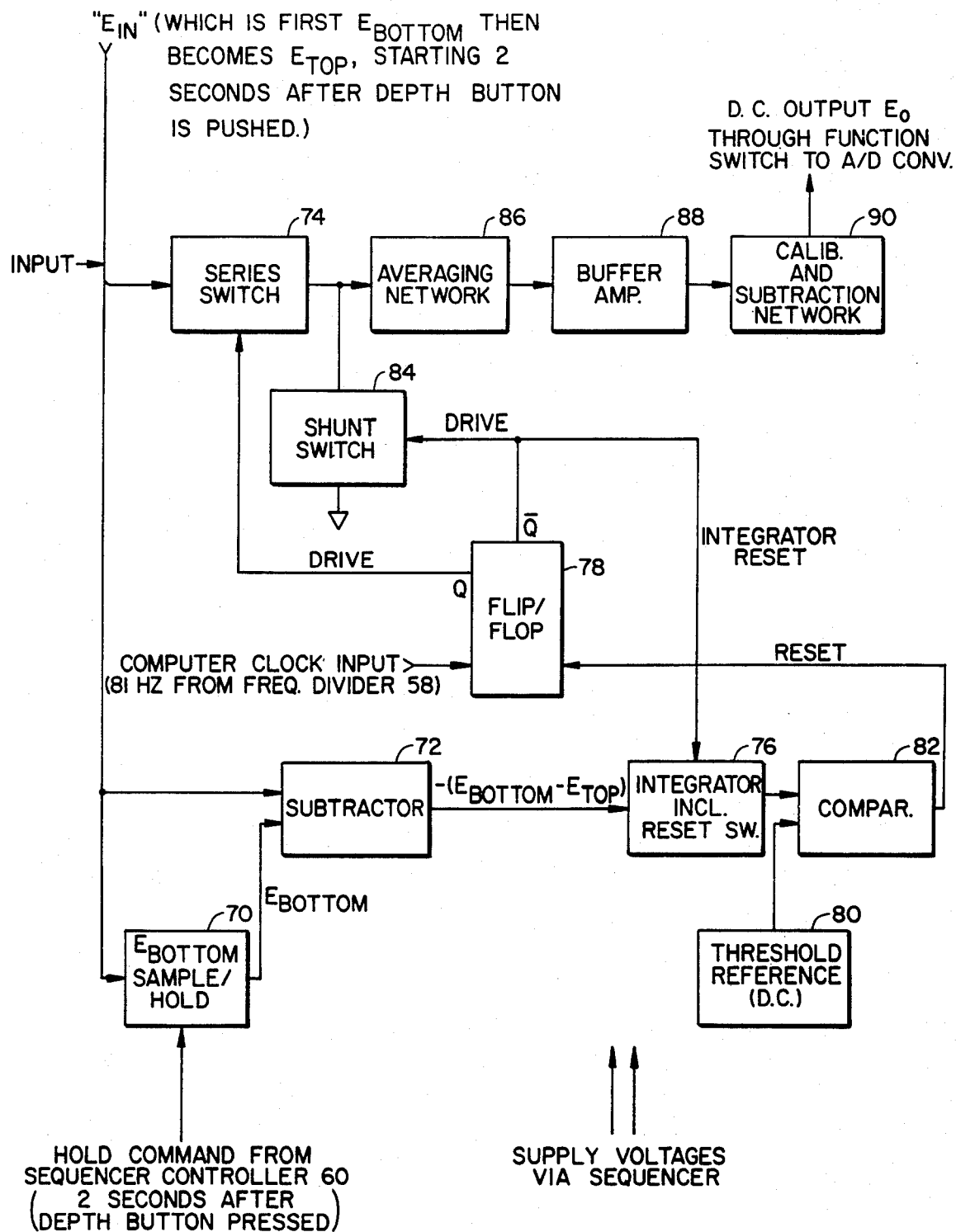
FIG._3.

"$E_{IN}$" IS THE D.C. DERIVITIVE OF THE SENSOR INPUT SIGNALS, WHICH IS FIRST $E_{BOTTOM}$ UNTIL 2 SECONDS AFTER DEPTH BUTTON IS PRESSED.
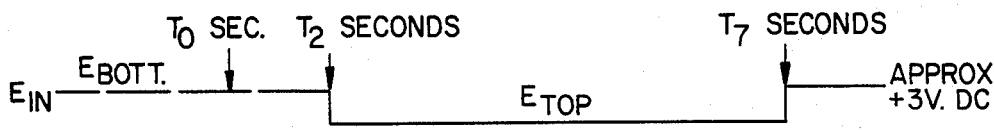
FIG._4A.
FIG._4B.
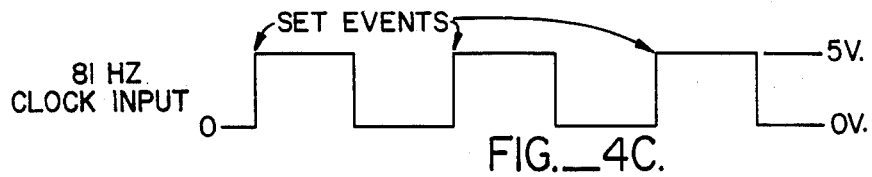
FIG._4C.
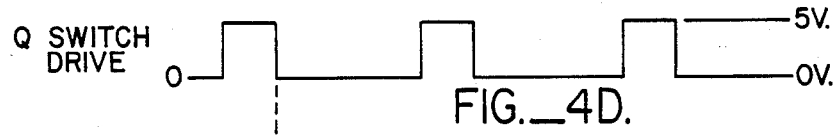
FIG._4D.
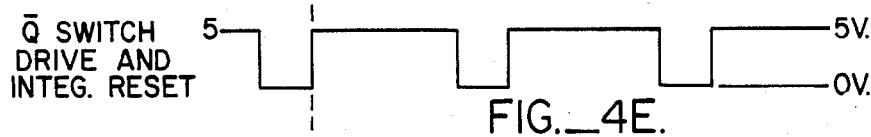
FIG._4E.
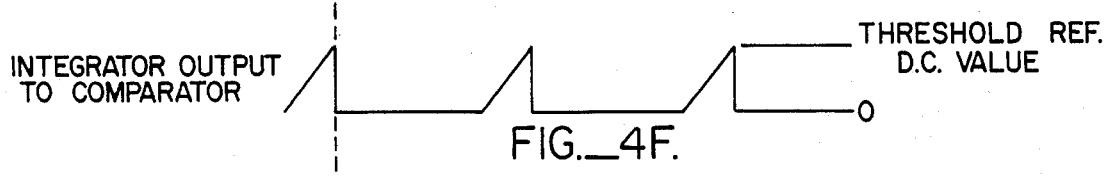
FIG._4F.
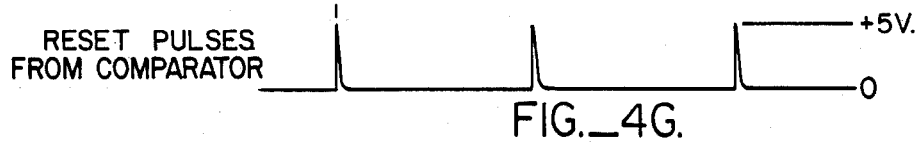
FIG._4G.
FIG._4H.

APPARATUS INCLUDING A PAIR OF AUTOMATIC GAIN CONTROLLED AMPLIFIERS FOR DETERMINING THE LATERAL DIRECTION TO A CONCEALED CONDUCTIVE OBJECT

This is a divisional application of a co-pending U.S. patent application Ser. No. 174,185 filed July 31, 1980, now U.S. Pat. No. 4,387,340.

TECHNICAL FIELD

This invention relates to a device for determining the distance to a concealed conductive object, and more particularly, it relates to an apparatus for automatically determining the depth measurement of a concealed conductive object, such as an underground pipe or cable, which is radiating an electromagnetic signal.

A number of electronic devices now exist and are commonly used to determine the location, in a horizontal plane, of buried or otherwise concealed electrically conductive structures. One type of such device uses an alternating current which is impressed on the structure, such as a pipe, wire or cable, by direct connection or inductive coupling. This structure can then be located, in the horizontal plane or laterally, above the ground, by use of a suitable horizontal axis pick-up coil and amplifier with an appropriate indicating device, such as a meter or audio transponder. As the receiver antenna or pick-up coil is brought closer to the structure being located, the signal level increases and the position nearest to the structure, i.e. directly above the structure, produces the strongest signal. One such device is described in the November 1965 issue of the BELL LABORATORIES RECORD, which employs two signal receptors or antennae, offset vertically, which sense a signal being radiated by an object. The ratio of the amplitudes of these signals from the two antennae is used to determine the depth of the object. This is accomplished in two steps. First, an amplified signal from the lower of the two antennae is sensed, and by means of a signal level adjustment, a meter is manually adjusted to full scale responsive to the signal. Thereafter, the lower antenna is disconnected, and an amplified signal from the upper antenna is fed to the same meter. The resulting scale deflection is then representative of the ratio of the signals, and indicates the depth of the object, since the meter is calibrated for this purpose. While this device is capable of providing good results, it is somewhat complex to operate in that it requires a number of manual steps. Moreover, inaccuracies can occur due to interference signals which produce inaccuracies in the measurement of the radiated signal. Inaccuracies may also occur because of errors in the manual adjustments, meter readings, and the exact location of the structure.

Another type of device is described in U.S. Pat. No. 3,893,025 and in Great Britain Pat. No. 1,509,914. However, this type of device uses an entirely different principal whereby the signal output from the two antennae are connected together in an electrically subtractive mode. The signal must be initially manually adjusted by an adjustable signal attenuator. The depth of the object is then read directly from a calibrated scale associated with the attenuator, or associated meter. Since this type of device requires an initial manual adjustment, it is subject to human error. Moreover, this type of apparatus is subject to inaccuracies due to interference signals. Finally, this type of apparatus has a non-linear characteristic and is not suitable for digital display.

DISCLOSURE OF THE INVENTION

The present invention is an apparatus for determining the distance to a concealed conductive object, whereby the object is radiating an alternating current signal. The apparatus has a first receptor and a second receptor, each adapted to receive the signal and to provide an output voltage in proportion to the strength of the signal received. The two receptors are placed on a support beam at a selected and fixed distance apart, whereby one receptor may be positioned a selected distance greater than the other from the object. Amplifier means with a gain for amplifying the output voltages is also provided. Automatic gain control means automatically controls the gain of the amplifier means such that the gain during the amplification of the output voltage of the first receptor is the same as the gain during the amplification of the output voltage of the second receptor. The calculation of the depth of the object is made by a computing means based upon the amplified output voltages. The calculated depth is then displayed on a display means.

BRIEF DESCRIPTION OF THE DRAWINGS

FIG. 1 is a perspective view of the apparatus of the present invention in operation.

FIG. 2 is an electrical block schematic diagram of an embodiment of the present invention.

FIG. 3 is an electrical block schematic diagram of the depth computer shown in FIG. 2.

FIG. 4 (A-H) are timing diagrams of the various components of the depth computer.

DETAILED DESCRIPTION OF THE DRAWINGS

Referring to FIG. 1, there is shown an apparatus 10 of the present invention, together with an example of its usage. As shown, the apparatus 10 of this invention is positioned on the surface of earth 12 above a buried cable 14, upon which an electromagnetic signal has been impressed. This signal is provided by transmitter 16 to cable 14. This may be accomplished by direct electrical connection to cable 14 by wire 18. Other types of coupling, such as inductive coupling through the use of an antenna (not shown), may also be employed. Typically, an unmodulated signal frequency of 83 KHz is employed. The apparatus 10 includes a lower bar 20 and an upper bar 22, spaced a selected distance apart and mounted on a vertical support 24. Electronic circuitry, shown in block schematic diagram form in FIG. 2, is contained in cabinet 26 which is also mounted on support 24. In the upper bar 22 is the top sensor 29, which is capable of receiving the signal radiated by the buried cable 14 and producing an output voltage proportional to the strength of the signal received. Near the intersection of the lower bar 20 and the vertical support 24 is the bottom sensor 28 which is also capable of receiving the signal generated by the buried cable 14 and producing an output voltage in proportion to the strength of the signal received. In the lower bar 20 to one side of the vertical support 24 is a left sensor 21 which is adapted to receive the signal from the buried cable 14 and to provide an output voltage in proportion to the strength of the signal received. To the other side of the vertical support 24 and in the lower bar 20 is a right sensor 23 which is capable of receiving the signal from the buried cable 14 and to provide an output voltage in proportion to the strength of the signal received. The left sensor 21 is identical to the right sensor 23. The relationship between the top and bottom sensors 29 and 28, and left and right sensors 21 and 23 is such that the line defined by the top and bottom sensors 29 and 28 is substantially perpendicular to and substantially bisects a line defined by the left and right sensors 21 and 23. In the cabinet 26 is a speaker 30, a digital display 32 and a meter display 34. A selector switch 36 and a depth switch 38 are also in the cabinet 26. These are explained in further detail as shown in FIG. 2.

Referring now to the circuitry of the system shown in FIG. 2, the bottom sensor 28 consists of an electrical pick-up or antenna coil and is positioned substantially in a horizontal position. The output of the bottom sensor 28 is connected to a preamplifier 40. The output of the preamplifier 40 is connected to a gain controlled amplifier 42 whose gain is controlled by the automatic gain control (AGC) amplifier 44. The output voltage, amplified by the amplifier 42, is connected to a first phase-sensitive detector 46, which also has connected to it the output from the phase-locked loop 48. The combination of the phase-locked loop 48 and the first phase-sensitive detector 46 converts the voltage amplified by the amplifier 42 into a DC voltage whose voltage is proportional to the AC signal voltage from the amplifier 42, which in turn of course is dependent upon the strength of the signal received by the bottom sensor 28. The DC output of the first phase-sensitive detector 46 is amplified by a DC amplifier 50. The DC amplifier 50 feeds an AGC sample/hold 52 which is used to control the AGC amplifier 44. And as previously described, the AGC amplifier 44 controls the gain of the amplifier 42. The output of the DC amplifier 50 is also connected to a depth computer 64. The output from the gain controlled amplifier 42 is also entered into the phase-locked loop 48. The phase-locked loop 48 is comprised of two major components: the phase-locked loop phase-sensitive detector 54 and the voltage controlled crystal oscillator (VCXO)/divider 56. The function of the phase-locked loop 48 is to produce an internal clocking signal synchronous with the signal from the bottom sensor 28 or from the top sensor 29. This clock signal is exactly in phase with the signal from the gain controlled amplifier 42, and is entered into the first phase-sensitive detector 46, thereby converting the AC signal into a DC signal which then is amplified by the DC amplifier 50. While other circuits may be used, the choice of a phase-lock loop 48 is to greatly eliminate noise. The VCXO 56 also produces a signal which is 90 degrees out of phase and is the clock for the phase-locked loop phase-sensitive detector 54, thereby producing a signal that is approximately zero voltage in DC. This is amplified and is entered into the VCXO 56 by an amplifier (not shown), producing an output which has a voltage swing between ±5 volts DC, and is entered into the VCXO 56 resulting in a signal having a constant frequency of 2.7 MHz. This frequency of 2.7 MHz is entered into the frequency divider section of the VCXO 56 which divides the frequency into a frequency which is the same as the frequency of the signal transmitted by the cable 14, i.e. 83 KHz.

When the depth switch 38 is activated, the sequencer controller 60 is activated at the same time. After approximately two seconds the sequencer controller 60 electronically switches the input of the gain controlled amplifier 42 from the bottom sensor 28 to the top sensor 29. Thus, a reading of the output voltage of the top sensor 29 is taken. The top sensor 29, similar to the bottom sensor 28 is comprised of an electrical pick-up or antenna coil and is also positioned substantially in a horizontal position. The output voltage of the top sensor 29 is connected to a pre-amp 62. Two seconds after activation of the sequencer controller 60, the sequencer controller 60 also instructs the AGC sample/hold 52 to hold the output of the DC amplifier 50 thereby holding the gain during the amplification of the output voltage of the top sensor 29 so that the gain is the same as the gain during the amplification of the output voltage of the bottom sensor 28. As before, the output voltage from the top sensor 29 amplified by the amplifier 42 is converted into a DC voltage by the first phase sensitive detector 46 clocked by the in-phase clock voltage from the phase lock loop 48. The DC output of the first phase sensitive detector 46 is amplified by the DC amplifier 50. The output of the DC amplifier 50 is also entered into the depth computer 64. Referring now to FIG. 3 the operation of the depth computer 64 is shown.

The depth computer 64 calculates the depth of the buried cable 14 in accordance with the following formula:

$$\text{Depth} = K \frac{E_{Top}}{E_{Bottom} - E_{Top}} - C$$

where
$E_{Top}$ = amplified output voltage of the top sensor 29
$E_{Bottom}$ = amplified output voltage of the bottom sensor 28
K = constant-distance between top sensor 29 and bottom sensor 28
C = another constant-offset distance between bottom sensor 28 and tip of vertical support 24 which is resting on earth 12.

The output of the DC amplifier 50 is connected to the depth computer 64. Within the depth computer 64 the connection from the DC amplifier 50 is made to a sample/hold 70, a subtractor 72, and a series switch 74. The sequencer controller 60 is also connected to the sample/hold 70. The output of the sample/hold 70 is connected to the subtractor 72. The output of the subtractor 72 is connected to an integrator 76 from which the output of a flip/flop 78 is also connected. The clock frequency (approx. 81 Hz) from the frequency divider 58 sets the flip/flop 78. The output of the integrator 76 along with a threshold DC reference 80 are connected to a comparator 82. The output of the comparator 82 resets the flip/flop 78. The output of the flip/flop 78 also drives the series switch 74 and the shunt switch 84. The shunt switch 84 and the series switch 74 are connected to an averaging network 86. The output of the averaging network 86 is connected to a buffer amplifier 88, which in turn is connected to a calibration and subtraction network 90. From the calibration and subtraction network 90, the depth computer 64 is connected to the A/D converter 66.

Referring to FIGS. 4(A-H) for the timing diagrams, in the operation of the depth computer 64, when the user activates the depth switch 38, the sequencer controller 60 begins at $T_0$. The amplified output voltage of the bottom sensor 28 (hereinafter $E_{Bottom}$) is read into the depth computer 64. At $T_2$ the sequencer controller 60 also initiates the sample/hold 70 to hold or store the value of $E_{Bottom}$. At $T_2$, the sequencer controller 60 automatically switches the input to the gain controlled amplifier 42 from the bottom sensor 28 to the top sensor 29. The input to the depth computer 64 is then the amplified output voltage of the top sensor 29 (hereinafter $E_{Top}$). Thus, at $T_2$, $E_{Bottom}$ is "held" in sample/hold 70 and is presented to subtractor 72, whereas $E_{Top}$ is also presented to subtractor 72. ($E_{Top}$ is also presented to the series switch 74). The output of the subtractor 72 determines the output positive ramp rate of the integrator 76 (the speed of the ramp is proportional to $E_{Bottom}-E_{Top}$). When the ramp equals the threshhold reference DC 80 (a preset positive reference voltage) the comparator 82 sends a reset pulse to flip/flop 78, whose reversing outputs now:

(a) open the series switch 74;
(b) close the shunt switch 84; and
(c) reset the output of the integrator 76 to zero.

This process of integrating $E_{Bottom}-E_{Top}$ and sampling $E_{Top}$ in proportion to the ramp time (which is in reciprocal proportion to $E_{Bottom}-E_{Top}$) is the basis for the division function required by the equation, and is started and repeated each time a clock pulse (81.05 hz) sets the flip/flop 78.

The buffer amplifier 88 prevents loading of the averaging network 86, after which the DC output passes through the calibration and subtraction network 90 for scale factor adjustment and subtraction of "C" before presentation to the A/D converter 66 and digital display 32. "C" is a small numerical value which represents the distance from the ground to the axis of the bottom sensor 28 and is subtracted by simply introducing a small constant current into the resistive calibration network.

The computing process ends after approximately 7 seconds from activation of the depth button, as determined by the digital timing circuits of the sequencer controller 60.

Referring back to FIG. 2 there is shown also the left sensor 21 and the right sensor 23 each of which is adapted to receive the signal and to provide an output voltage in proportion to the strength of the signal received. The left and right sensors 21 and 23 are also electrical pick-up or antenna coils and are combined in a subtractive mode, i.e. the sensors 21 and 23 are connected in anti-phase. The output of the combined signal from the left sensor 21 and the right sensor 23 is connected to a pre-amp 100. The signal from the pre-amp 100 is amplified by yet another gain controlled amplifier 102 whose gain is similarly controlled by the AGC amplifier 44. The output of the gain controlled amplifier 102 is entered into a L/R phase sensitive detector 104 which is also clocked by the in-phase clock voltage from the phase lock loop 48. As discussed heretofore, the function of the gain controlled amplifier 102 is to amplify the output voltage of the combined signal of the left and right sensor 21 and 23 respectively, whereas the L./R phase sensitive detector 104 and phase lock loop 48 combine to produce an output which is a DC voltage which is proportional to the combined subtracted signal received by the left and right sensors 21 and 23. The polarity of the DC voltage (i.e. + or −) is determined by the phase of the combined subtracted signals. The phase of the output voltage from the bottom sensor 28 is used as a reference. Since the 0° clock voltage from the VCXO 56 is exactly in phase with the output voltage from the bottom sensor 28, the 0° clock voltage from VCXO 56 may also be used as a reference to the L/R phase sensitive detector 104. If the combined subtracted signal is in phase with the 0° clock voltage signal from the VCXO 56, the output of the L/R phase sensitive detector 104 is a positive DC voltage. Conversely, if the combined subtracted signal is out of phase (by 180°) with the 0° clock voltage signal from the VCXO 56, the output of the L/R phase sensitive detector 104 is a negative DC voltage. The L/R phase sensitive detector 104 is connected to a meter driving amplifier 106 which is connected to the meter display 34. The output of the meter driving amplifier 106 is also connected to an audio-driver 108 which is gated by the frequencies from the frequency divider 58 and is connected to the speaker 30.

In a variation of the embodiment of the present invention shown in FIG. 2, the left and right sensors 21 and 23 respectively may be replaced by a single sensor, such as a pick-up coil, positioned in a substantially vertical position. The output of this sensor would also be connected to the pre-amp 100. The phase of the bottom sensor 28 is also used as a reference. When this single sensor is directly over the cable 14, its output voltage is substantially zero. When this single sensor is to one side of the cable 14 it produces a non-zero output voltage. The phase of the bottom sensor 28 is used as a reference to determine at which side of the cable 14 the single sensor is located. Although this embodiment (the replacement of the left and right sensors 21 and 23 by a single sensor) would also give the user information regarding the direction to the cable 14, the embodiment shown in FIG. 2 is preferred.

In the operation of the apparatus 10 of the present invention, the apparatus 10 is first activated by the selector switch 36. The signal from the buried cable 14 is received by the left sensor 21 and the right sensor 23. As can be seen, in the event the apparatus 10 is to one side of the buried cable 14 the combined subtractive signals from the left sensor 21 and the right sensor 23 will result in a non-zero voltage. This is because with the apparatus 10 to one side of the cable 14, one of the identical sensors (left or right) will receive a greater signal than the other. Thus, the output voltage of the one will be greater than the other. The combined voltage is amplified by the pre-amp 100 and by the gain controlled amplifier 102. This voltage is converted into a DC voltage by the L/R phase sensitive detector 104 and correspondingly will drive the meter driving amplifier 106 resulting in a deflection on the display meter 34. The polarity of the DC voltage, as determined by the phase of the bottom sensor 28, determines the direction of deflection on the display meter 34. Similarly, the same amplified DC voltage is fed into the audio-driver 108 with the resultant output on the speaker 30. Both the visual output, as indicated by the display meter 34, and the audio output, as indicated by the speaker 30, are indications to the user that the apparatus 10 is not directly over the buried cable 14. If the apparatus 10 is to the right of the cable 14 the meter 34 would indicate the deflection to the left indicating that the user should move to his/her left in order to be directly on top of the buried cable 14. Similarly, the output to the speaker 30 can be of two different tones: one a steady audio tone and another of a chopped tone, depending on whether the user is to the right or to the left of the buried cable 14. Once the user has moved directly over the top of the buried cable 14, the combined subtracted output of the left and right sensors 21 and 23 will be a zero signal voltage. This zero voltage amplified by the gain controlled amplifier 102 and converted into a DC level by the L/R phase sensitive detector 104 would still yield a zero voltage. Thus the meter 34 would not deflect nor would the speaker 30 be activated. At that point, the user can commence the depth reading. This is accomplished by activating the depth switch 38 which begins the operation of the sequencer controller 60. And as previously described the reading from the bottom sensor 28 is initially amplified by the gain controlled amplifier 42, converted to a DC voltage by the first phase sensitive detector 46, amplified by the DC amplifier 50, and stored in the depth computer 64. After a predetermined interval, approximately 2 seconds, the sequencer controller 60 instructs the AGC sample/hold 52 to hold the value from DC amplifier 50. This in turn holds the gain of the AGC amplifier 44 at the level at which the amplification of the signal from the bottom sensor 28 was made. At the same time, the sequencer controller 60 electronically switches the input to the amplifier 42 from the bottom sensor 28 to the top sensor 29. The output of the amplifier 42 is converted to a DC voltage again by the first phase sensitive detector 46 and amplified by the DC amplifier 50. This is also entered into the depth computer 52 which computes the depth of the cable 14 based on the two values of the two voltages amplified. The result of computation is entered into an A./D or analog to digital converter/display driver 54 which is then displayed on the digital display 32, which is a liquid crystal display.

From the foregoing, it can be seen that there are a number of advantages to the apparatus 10 of the present invention. First, unlike the apparatuses as taught in U.S. Pat. No. 3,893,025 and Great Britain Pat. No. 1,509,914, the apparatus of the present invention does not use a sensor subtractive mode for the computation of the depth. This results in a greater degree of linearity which makes practical the display of the readout in digital format. However, unlike the apparatus taught by the reference described in the November 1965 issue of the *Bell Laboratories Record,* the apparatus of the present invention overcomes the difficulty of inaccuracies due to manual adjustment by automatically locking in onto the gain of the amplifier such that the gain during the amplification of one of the signals is same as the gain during the amplification of the other signal. This of course results in a greater degree of accuracy than heretofore achieved and decreases the number of manual steps involved. In addition, the apparatus of the present invention greatly reduces interference signals, thereby increasing accuracy. Moreover, unlike the apparatuses taught by all the references heretofore mentioned, the apparatus 10 of the present invention has horizontal detection means, i.e. left and right sensors 21 and 23, to indicate more precisely when the apparatus 10 of the present invention is directly over the underground cable 14 to be measured. There is no guesswork as to the precise location of the underground cable 14. Inasmuch as error in measurement can occur if the apparatus 10 is not directly over the underground cable 14, the employment of left and right sensors 21 and 23 to determine the lateral position of the cable 14 is therefore important in increasing the accuracy of the depth measurement. Finally, the use of the sequencer controller 60, insures an automatic process of measuring the signal received by the bottom sensor 28, storing it in memory, holding the value of the gain for the amplification means, and amplifying the signal received by the top sensor 29. All this insures that simplicity of operation will be achieved, and that human handling is at a minimum thereby minimizing the chances of error.

I claim:
1. An apparatus for determining the lateral direction to a concealed conductive object in order to determine its depth, wherein the object is radiating an alternating current signal, said apparatus comprising:
 first signal receptor coil means for receiving said signal and for providing a first output voltage in proportion to the strength of said signal received, said first coil means having a first axis;
 second signal receptor coil means for receiving said signal and for providing a second output voltage in proportion to the strength of said signal received, said second coil means having a second axis;
 support means for positioning said first and second signal receptors a selected and fixed horizontal distance apart and with said first axis and said second axis coaxially aligned;
 signal combining means for combining said first output voltage and said second output voltage in a subtractive mode to produce a combined output voltage;
 third signal receptor positioned along a line which is substantially perpendicular to and which bisects a line defined by the first and second coil means; said third signal receptor for receiving said signal and for providing a third output voltage in proportion to the strength of said signal received and having a reference phase;
 first amplifier means with an input, an output and a gain for receiving said third output voltage at the input and for providing an amplified third output voltage at the output;
 second amplifier means with an input, an output and a gain for receiving said combined output voltage at the input and for providing an amplified combined output voltage at the output;
 automatic gain control means responsive to said third output voltage for automatically controlling the gain of said first and second amplifier means such that the gain of said first and second amplifier means is the same;
 phase detecting means responsive to said amplified combined output voltage and to said amplified third output voltage for converting said amplified combined output voltage to a direct current voltage with polarity determined by said reference phase; and
 indicating means responsive to said direct current voltage for indicating direction to said object.
2. The apparatus of claim 1 wherein said phase detecting means comprises a phase lock loop.
3. The apparatus of claim 1 wherein said indicating means is a meter.
4. The apparatus of claim 1 wherein said indicating means is an audio signal.
5. The apparatus of claim 4 wherein said audio signal being coded to indicate lateral direction to said object.
6. The apparatus of claim 5 wherein said audio signal having a magnitude component to indicate relative distance to said object.
7. The apparatus of claim 3 wherein said meter having a magnitude component to indicate relative distance to said object.

* * * * *